Feb. 27, 1951 E. H. HUGENHOLTZ ET AL 2,543,577

TUBE SOCKET AND HOLDER FOR ELECTRICAL PARTS

Filed May 9, 1946

EDUARD HERMAN HUGENHOLTZ
FRANK KRIENEN
INVENTORS.

BY R. J. Wenderoth
ATTORNEY.

Patented Feb. 27, 1951

2,543,577

UNITED STATES PATENT OFFICE 2,543,577

TUBE SOCKET AND HOLDER FOR ELECTRICAL PARTS

Eduard Herman Hugenholtz and Frank Krienen, Eindhoven, Netherlands, assignors, by mesne assignments, to Hartford National Bank and Trust Company, Hartford, Conn., as trustee Application May 9, 1946, Serial No. 668,359
In the Netherlands March 25, 1942

Section 1, Public Law 690, August 8, 1946
Patent expires March 25, 1962

3 Claims. (Cl. 173—328)

This invention relates to a holder for electric parts, for example a coil holder or a tube holder adapted to be used in a chassis, for example for a radio receiver or an amplifier, part of the holder being placed above or in an aperture of the chassis plate, which holder is made of insulating material having mounted in it metal contact members.

Such holders are usually placed in an aperture of the chassis, due to which it is possible to establish the electrical connections for the metal contacts of the holder at the inside of the chassis. The invention has for its purpose to profit by this circumstance in the construction of the chassis, resulting in the manufacture of the latter being simpler and less expensive.

For this purpose metal parts are placed in the insulating material of the holder in such manner that electrical connections other than that for the electric part to be placed in the holder are thus led from the top end to the bottom end of the tube holder, that is to say from one to the other side of the chassis plate.

With each connection thus established a separate inlet aperture in the chassis, together with the associated insulator, is thus rendered superfluous, profit being taken by the insulating material already present in the holder.

It may be advisable that holes of the holder should have passed through them continuous metal conductors for example pins or sleeves, which end at the inside and the outside respectively of the chassis and do not serve to make contact with the part to be placed in the holder. Instead of separate pins, they may of course also be parts of the conductors themselves, which constitute a connection in one piece between electric parts arranged on each side of the chassis plate.

Different tube holders have previously been put on the market of which the metal contact members comprised connecting poles both at the top end and at the bottom end of the edge of the insulating body, for example a nut at the top end and a soldering tag at the bottom end. However, these parts were both located on the same side of the chassis plate so that these connecting members do not enable an electrical connection to be established between parts located on each side of the chassis plate.

The idea of the invention may be realized in a simple manner in the cases suitable thereto by making one of the contact members in the holder in a continuous form so that it protrudes both at the inside and at the outside of the chassis and may be used for the connection of a supply conductor, for example by means of tags.

In order that the invention may be more clearly understood and readily carried into effect, it will be explained more fully by reference to the accompanying drawing.

Figure 1:
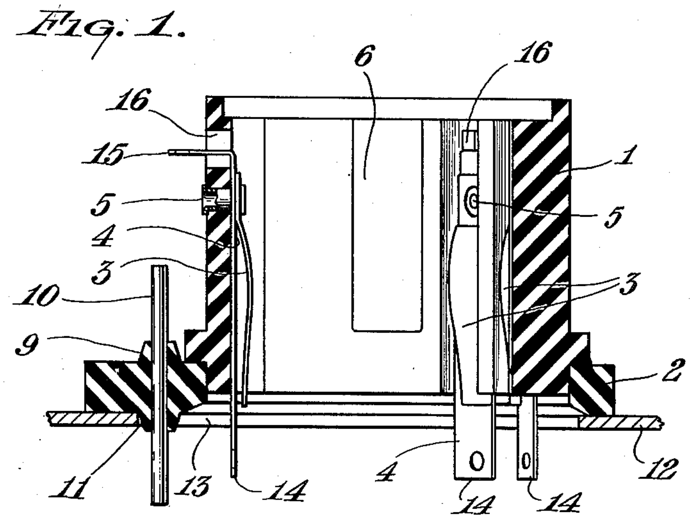
Figure 2:
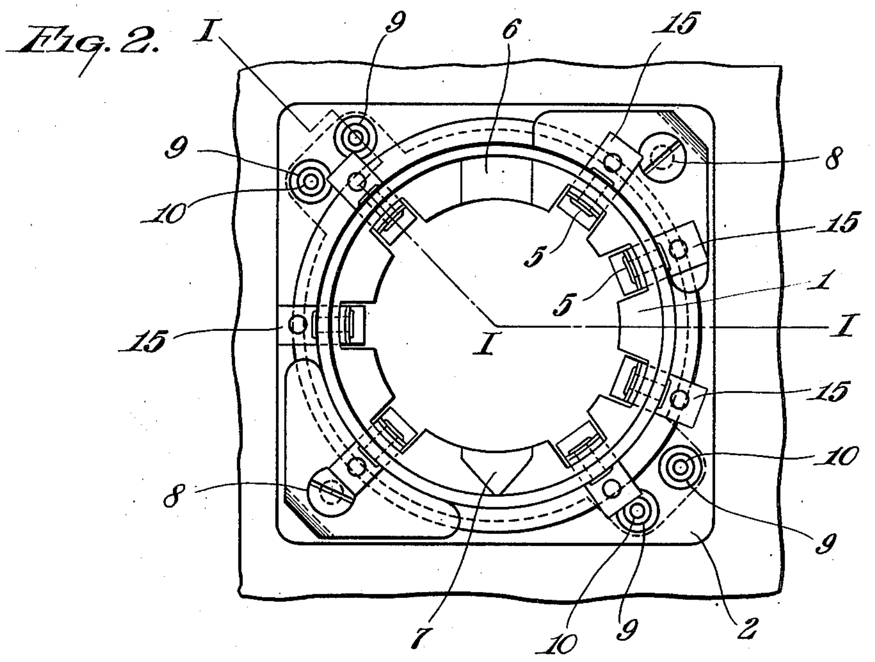

Figs. 1 and 2 of the drawing show one practical example of the invention in part in two projections and in part in section.

Fig. 1 shows a tube holder which is constituted by a hollow cylindrical top part 1 and a square bottom part 2, which are both of insulating material and secured together in a conventional manner. The top part 1 contains contact springs 3 constituted by narrow resilient metal strips which are fastened to a strip 4 of the same width by means of a flanged sleeve 5 which also serves to anchor the two strips in an axial groove of the cylinder 1. The socket assembly is attached to the chassis in the usual manner, e. g. by fastening pins or the like.

Fig. 2 shows how seven of these contact springs are distributed in an irregular manner along the circumference of the aperture in which the discharge tube has to be inserted, this aperture being provided in addition with recesses 6 and 7 which correspond to similarly shaped parts of a lever with which the associated discharge tube is provided. In the corners of the bottom part 2 are provided in one diagonal two fastening holes 8, whereas in the other diagonal two bosses 9 are pressed into the inuslating material which have passed through them a continuous metal pin 10 which is accessible at the top side of the bottom part 2 and at the opposite side may be passed through a corresponding recess 11 of the chassis plate 12 so that along this pin electrical connections from the one to the other side of the chassis plate are led. These recesses form part of an aperture 13 indicated in dotted line, through which contact tags 14 of the strips 4 which protrude at the bottom end are accessible, the strips at the top end being bent at right angles and thus passing with the aid of tags 15 through the apertures 16 of the tube holder which are provided in the peripheral surface 1.

With the aid of the described construction it is possible to cause electrical connections which are entirely out of contact with the connecting members of the tube holder to extend in 10 from one to the other side of the chassis plate, whereas connections placed at the same potential with one of the tube pins may be led from one to the other side by means of the strips 4 provided with tags 14 and 15. In this case four separate electrical connections may thus be led through the chassis plate and, in addition, a certain number of connections which coincide with the tube contacts, without it being necessary to provide for them separate inlet apertures in the chassis plate. In addition to the stated constructive simplification one thus obtains the possibility to mount definite electric parts in constructive relation with the associated tube holder or coil holder outside on the chassis without any complications being involved due to the supply conductors, while in this case either at the inside of the chassis plate a saving of space is obtained, or for example the screening of the relevant electric parts relatively to the elements mounted inside the chassis is ensured in a simple manner.

We claim:

1. A socket holder adapted to be secured to a chassis plate of a radio receiver and provided with a separate insulated passageway for passing an electrical conductor from one side of the chassis plate to the other side of the chassis plate independently of connections to be made to an electrical component in the holder, comprising a tubular body of insulating material aligned with an aperture in the chassis plate providing a socket for receiving and securing the electrical component in fixed position, said tubular body being provided with a flange portion for securing the socket holder to the chassis plate, said flange portion being provided with a boss having an aperture therein extending through the flange from one side of the chassis plate to the other side thereof, thereby providing an insulated passageway through the socket holder independent of the socket connections for the electrical component.

2. A socket holder as claimed in claim 1, in which a separate pin member is inserted into the aperture in the boss for providing a separately insulated conductor extending through the chassis plate, which is independent of the socket connections.

3. A socket holder as claimed in claim 2, in which tube connections are made by spring contacts which extend along the inner wall of the tubular body and terminate through the wall thereof, the socket connections being entirely independent of the pin member.

EDUARD HERMAN HUGENHOLTZ.
FRANK KRIENEN.

REFERENCES CITED

The following references are of record in the file of this patent:

UNITED STATES PATENTS

| Number | Name | Date |
|---|---|---|
| 1,688,772 | Alden | Oct. 23, 1928 |
| 1,707,702 | Alden | Apr. 2, 1929 |
| 1,850,583 | Gage | Mar. 22, 1932 |
| 2,071,769 | Schlicker et al. | Feb. 23, 1937 |
| 2,074,397 | Israel | Mar. 23, 1937 |
| 2,450,873 | Antony, Jr. | Oct. 12, 1948 |
| 2,453,015 | Jackson | Nov. 2, 1948 |

FOREIGN PATENTS

| Number | Country | Date |
|---|---|---|
| 189,339 | England | Nov. 30, 1922 |
| 538,925 | Germany | Nov. 5, 1931 |
| 633,444 | France | Oct. 24, 1927 |
| 719,044 | France | Nov. 13, 1931 |
| 806,499 | France | Sept. 28, 1936 |